United States Patent
Baeuerle

(10) Patent No.: US 6,467,262 B1
(45) Date of Patent: Oct. 22, 2002

(54) EMERGENCY HYDRAULIC CONTROL FOR A CLUTCH ARRANGED BETWEEN AN INTERNAL COMBUSTION ENGINE AND A GEAR BOX

(75) Inventor: Peter Baeuerle, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/601,772

(22) PCT Filed: Nov. 27, 1999

(86) PCT No.: PCT/DE99/03777

§ 371 (c)(1),
(2), (4) Date: Sep. 22, 2000

(87) PCT Pub. No.: WO00/34678

PCT Pub. Date: Jun. 15, 2000

(30) Foreign Application Priority Data

Dec. 7, 1998 (DE) .......................... 198 56 297

(51) Int. Cl.[7] .............................................. F16D 25/00
(52) U.S. Cl. ................... 60/403; 60/468; 91/33; 192/85 R
(58) Field of Search .................. 60/403, 468; 91/32, 91/33, 446; 192/85 R

(56) References Cited

U.S. PATENT DOCUMENTS 4,487,304 A * 12/1984 Young ..................... 192/85 R 5,787,710 A * 8/1998 Baeuerle ................... 192/12 C

FOREIGN PATENT DOCUMENTS

| DE | 44 24 790 A | 1/1996 |
|----|-------------|--------|
| EP | 0 516 309 A | 12/1992 |
| EP | 0 763 443 A | 3/1997 |
| EP | 0 728 265 B1 | 3/1998 |

* cited by examiner

*Primary Examiner*—F. Daniel Lopez
(74) *Attorney, Agent, or Firm*—Michael J. Striker

(57) ABSTRACT

A hydraulic emergency control (10, 10a, 10b, 10c) for a hydraulically actuated clutch (14) arranged between an internal combustion engine (12) is proposed. A pump (16) driven by the internal combustion engine (12) feeds a work line (18) in which a choke (20, 20b, 20c) is arranged. A regulating valve (22, 22a, 22b, 22c) is provided for controlling the clutch (14) at least in the event of failure of the electric supply. A first control line (26) is connected by a first control input (S1) of the regulating valve (22, 22a, 22b, 22c) with the work line (18) in front of the choke (20, 20b, 20c) with respect to the feed direction. A second control line (30) is connected by a second control input (S2) of the regulating valve (22, 22a, 22b, 22c) with the work line (18) behind the choke (20, 20b, 20c) with respect to the feed direction. Through the use of a regulating valve (22, 22a, 22b, 22c), a variable control of the clutch (14) is possible also in emergency operation. In all, very few structural component parts are required for this purpose.

9 Claims, 5 Drawing Sheets

EMERGENCY HYDRAULIC CONTROL FOR A CLUTCH ARRANGED BETWEEN AN INTERNAL COMBUSTION ENGINE AND A GEAR BOX

BACKGROUND OF THE INVENTION

1. Field of the Invention

The present invention relates to an electrohydraulic system for controlling a hydraulically actuated clutch arranged between an internal combustion engine and a transmission associated with the engine and, more particularly, to hydraulic emergency control means for controlling the clutch, especially in the event of failure of an electric supply for the electrohydraulic control system for the clutch.

2. Description of the Related Art

A hydraulic emergency control for a hydraulically actuated clutch arranged between an internal combustion engine and a transmission is known from EP 0 728 265 B1. This hydraulic emergency control is part of an electrohydraulic clutch control system having at least one pump driven by the internal combustion engine for feeding at least one work line. At least one fixed or variable choke is arranged in the at least one work line. At least one valve constructed as a switching valve is provided for controlling the clutch at least in the event of failure of the electric supply of the electrohydraulic clutch control. A first control line is connected with a first control input of the switching valve and is connected, in front of the choke with respect to the feed direction, with the work line. A second control is connected with a second control input of the switching valve and, behind the choke with respect to the feed direction, with the work line.

Further, a 4/2-directional valve is provided in the second control line and acts upon a spring-loaded accumulator communicating with a line leading to the clutch. The switching valve controls a clutch pressure valve that communicates with the clutch via a line. Another choke with a check valve is provided in this line. The construction of this hydraulic emergency control is therefore quite complicated. In the event of outage of the electric supply for the clutch control, the clutch pressure valve sets the maximum clutch pressure. Because of the accumulator and choke, the clutch pressure does not rise suddenly, but rather slowly along a fixed ramp As a result of this arrangement, a variable change in the dutch pressure increase is not possible, so that the closing of the clutch is also not variable. However, since a variable closing of the clutch is desired or required depending on the respective start situation—starting on an ascending or descending grade, for example—the closing of the clutch may cause discomfort or inconvenience in many situations.

SUMMARY OF THE INVENTION

It is an object of the present invention to provide a hydraulic system for a hydraulically actuated clutch arranged between the internal combustion engine and its transmission, which is part of the electrohydraulic clutch control system and which includes a hydraulic emergency control means, that does not suffer from the above-described disadvantage.

According to the invention the hydraulic system for a hydraulically actuated clutch arranged between an internal combustion engine and a transmission, which is part of an electrohydraulic clutch control system for the clutch and which includes hydraulic emergency control means, comprises a pump driven by the internal combustion engine and delivering pressurized fluid to a work line;

a throttle valve in the work line;

a regulating valve having an output port connected to the clutch by a clutch line, which controls the clutch upon failure of an electrical supply for the electrohydraulic clutch control system;

a first control line connected to the work line upstream of the throttle valve and to a first control input of the regulating valve;

a second control line connected to the work line downstream of the throttle valve and to a second control input of the regulating valve;

a third control line connected to the clutch line and to a third control input of the regulating valve;

wherein, when pressure in the first control line increases faster than pressure in the second control line, an opening cross section between a pressure port and the output port increases.

The hydraulic emergency control according to the invention for a hydraulically actuated clutch arranged between an internal combustion engine and a transmission has the advantages that its construction is substantially simpler due to the use of a regulating valve for controlling the clutch and that a variable closing of the clutch is possible.

The construction of the hydraulic emergency control is particularly simple when the working connection of the regulating valve is connected with the clutch by at least one clutch line and does not act on another valve for controlling the clutch. The regulation of the clutch pressure is simplified, particularly by a return line of the first regulating valve that is connected with the clutch line and a control input of the regulating valve. In particular, it is advantageous when the return line is connected with a second control input of the regulating valve A definite position of the regulating valve can be reached when a restoring spring or return spring is arranged at a control input of the regulating valve. This return spring can be arranged at the first or second control input of the regulating valve. When the first control input of the regulating valve is electrically or hydraulically controllable, the regulating valve can also be advantageously used in normal operation for controlling the clutch, so that a separate regulating valve for controlling the clutch in normal operation can be eliminated. It is advantageous when the choke is directionally switchable electrically or hydraulically in normal operation and can be switched on via a spring if the electric supply fails.

Further advantages and advantageous further embodiments of the hydraulic emergency control according to the invention for a hydraulically actuated clutch arranged between an internal combustion engine and a transmission are described in the appended dependent claims and the following description.

BRIEF DESCRIPTION OF THE SEVERAL VIEWS OF THE DRAWING

The objects, features and advantages of the invention will now be illustrated in more detail with the aid of the following description of the preferred embodiments, with reference to the accompanying figures in which.

DETAILED DESCRIPTION OF THE INVENTION

When using an automatic transmission without a converter, the starting clutch must provide additional functions. To prevent the engine from stalling when the vehicle is stopped, the drive side (engine side) of the clutch and the driven side of the clutch must be separated. It may be appropriate to transmit a defined clutch torque that enables a gradual rolling of the vehicle when the clutch is engaged, as customary for the driver with a converter as starting element. During the starting process, the clutch slip should continuously return to null. During normal operation, the starting clutch remains closed. It may be that a defined clutch slip is permissible or desirable. In automatic transmissions, the clutch control is generally carried out electrohydraulically. In the event of an outage of the electric supply, the electric control signal for the clutch control also fails; therefore, in this case, a purely hydraulic clutch control is to be provided which fulfills the additional functions mentioned above and does not require any further cost-intensive added components in the transmission, e.g., a pitot tube.

Figure 1:
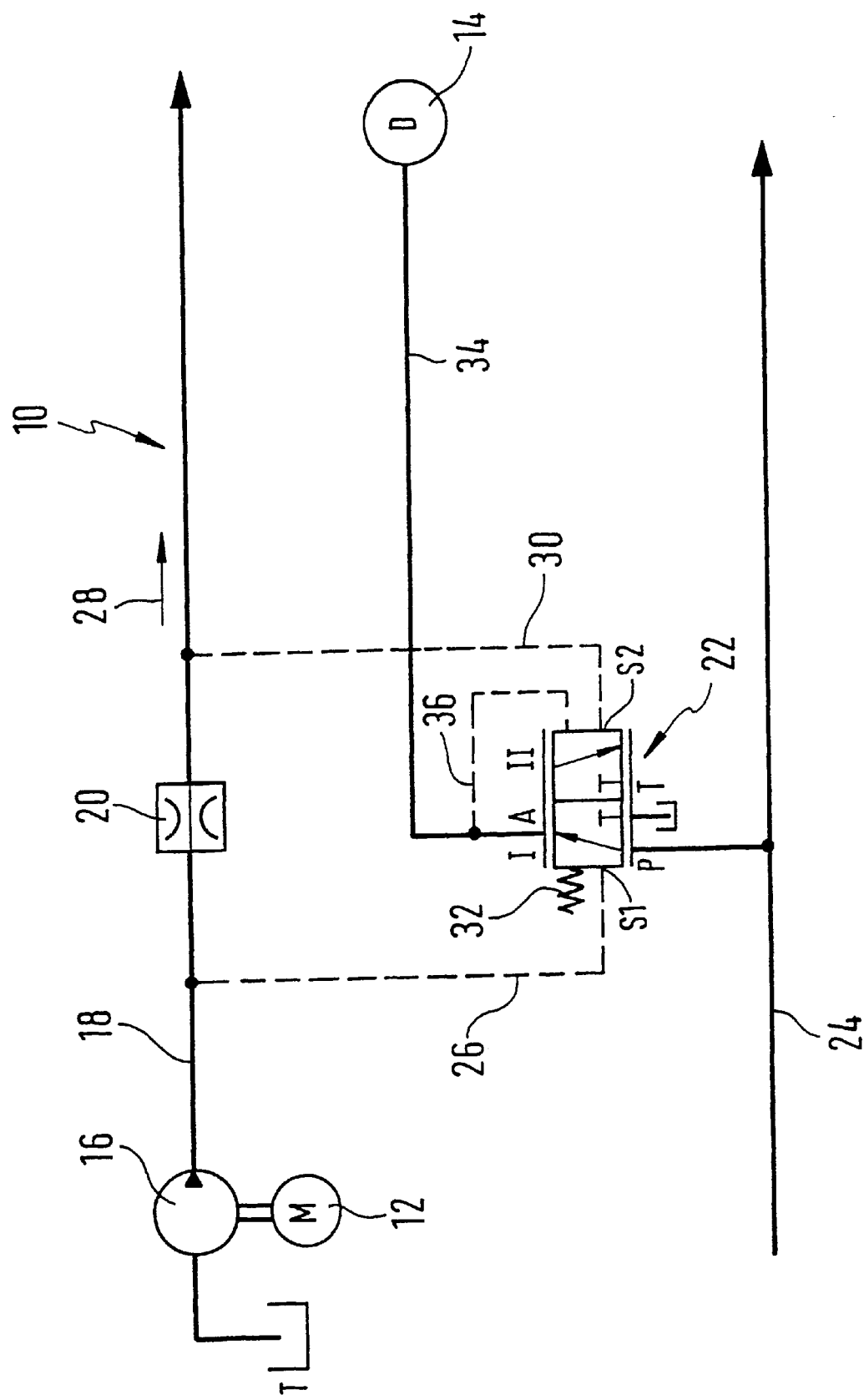
FIG. 1 shows a schematic view of a hydraulic emergency control.

FIG. 1 shows a hydraulic emergency control 10 for a hydraulically actuated clutch 14 arranged between an Internal combustion engine 12 and a transmission, not shown. In the present embodiment example, this clutch 14 is a friction clutch. The hydraulic emergency control 10 is part of an electrohydraulic clutch control system. The hydraulic emergency control 10 has at least one hydrostatic pump 16 that is driven by the internal combustion engine 12 and is used to feed at least one work line 18. The hydraulic oil required for feeding the at least one work line 18 is drawn from the tank T by the pump 16. A choke 20 is arranged in the work line 18. The choke 20 can be a fixed or variable throttle valve or a diaphragm. Generally, the choke 20 should be located in an oil-carrying work line 18 that is fed directly by the pump 16. In this regard, the entire pumped amount need not flow through this work line 18. It is much more important that the oil volume flow through the line 18 during the starting process is a function of the engine rotational speed and that the oil volume flow steadily rises as the engine rotational speed increases. Any number of different valves may be arranged between the pump 16 and the choke 20.

The hydraulic emergency control 10 has at least one regulating valve 22. The regulating valve 22 serves to control the clutch 14 at least during failure of the electric supply of the electrohydraulic clutch control system. The regulating valve 22 has a pressure connection P followed by a supply line 24. In a first regulating position 1, the pressure connection P is connected with the work connection A. A tank connection T is closed. In a second regulating position II, the work connection A is connected with the tank connection T. The pressure connection P is closed.

The hydraulic emergency control 10 further has a first control line 26 which is connected with a first control input Si of the regulating valve 22 and is connected with the work line 19 in front of the choke 20 in the feed direction 28. In addition, a second control line 30 is provided and is connected by a second control input S2 of the regulating valve 22 with the work line 18 after the choke 20 in the feed direction 28. A return spring 32 is arranged at one of the control Inputs S1, S2 of the regulating valve 22. In the hydraulic emergency control 10 shown in FIG. 1, the regulating valve 22 has the return spring 32 arranged at its first control input S1.

The work connection A of the regulating valve 22 is advantageously connected with the clutch 14 via at least one clutch line 34. A return line 36 of the regulating valve 22 is connected with the at least one clutch line 34 and with a control input, advantageously the second control input S2, of the regulating valve 22. This provides a simply possibility for regulating the pressure in the clutch line 34. A simple controlling of the clutch 14 without additional structural component parts is made possible by the direct connection of the regulating valve 22 with the clutch 14.

Figure 2:
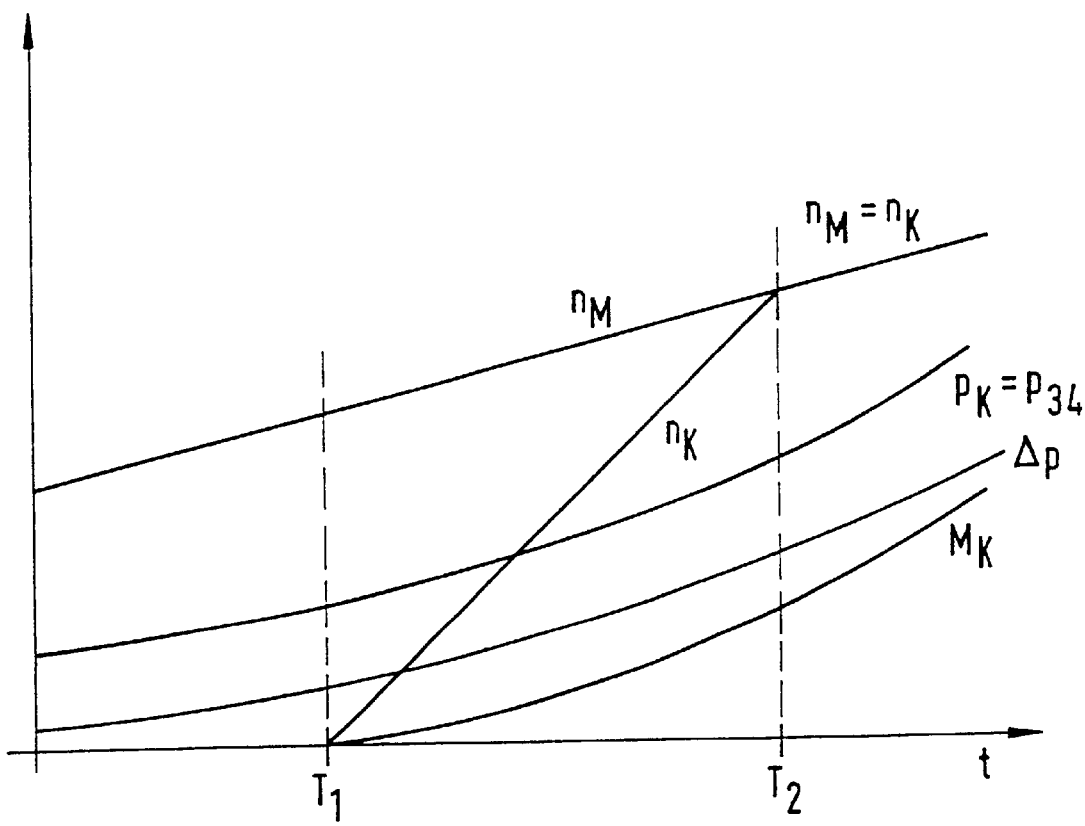
FIG. 2 is a graphical illustration with different characteristic lines over time during the closing of the clutch.

The operation of the hydraulic emergency control 10 will be explained with reference to the characteristic lines in the graph in FIG. 2. As the engine rotational speed $n_M$ increases over time t, particularly during a starting process, the feed rate of the pump 16 rises proportionately. There is a pressure drop $\Delta p$ at the choke 20. The pressure drop $\Delta p$ corresponds to the difference between pressure $p_{26}$ of the first control line 26 and pressure $P_{30}$ of the second control line 30. When the engine rotational speed $n_M$ represented by the characteristic line in FIG. 2 increases, the pressure drop $\Delta p$ also increases. Since pressure $p_{26}$ in the control line 26 rises with increasing steepness in relation to pressure $p_{30}$ in the second control line 30, the opening cross section of the connection between the pressure connection P and the work connection A increases at the regulating valve 22 in the first regulating position 1. Accordingly, a greater pressure $p_{24}$ of the supply line 24 is also transmitted to the clutch line 34 and therefore to the clutch 14. The pressure $p_{34}$ is conducted by the return line 36 to the second control input S2 of the regulating valve 22. The pressure $p_{34}$ in the clutch line 34 corresponds to the pressure $P_K$ occurring at the clutch 14. A simple regulation of the pressure $P_K$ at the clutch 14 is made possible in this way After a determined pressure $P_K$—identified by time $T_1$ in the graph of FIG. 2—the clutch pressure $P_K$ is sufficient to transmit a torque $M_K$ from the clutch 14. Since a torque $M_K$ is transmitted from the clutch 14 on its driven side, the vehicle begins to move. The beginning of rotation of the clutch 14 is represented in the graph in FIG. 2 by characteristic line $n_K$, which represents the driven-side rotational speed of the clutch 14. With a continuing increase in the engine rotational speed $n_M$, which corresponds to the input-side rotational speed of the clutch 14, the pressure drop $\Delta p$ at the choke 20 increases, so that the regulating valve 22 opens further. Therefore, the pressure $P_K$ at the clutch 14 also increases until the engine rotational speed $n_M$ and the driven-side rotational speed of the clutch $n_K$ are identical. This is shown in the graph in FIG. 2 by time T2. At time T2, the slip of the clutch halves is null.

Through the use of the regulating valve 22, the rise in pressure $p_K$ at the clutch 14 can be regulated depending on the increase in the engine rotational speed. This enables a comfortable starting, wherein the closing of the clutch 14, i.e., the time within which the clutch halves close, is variable and is adapted to the respective starting situation.

Figure 3:
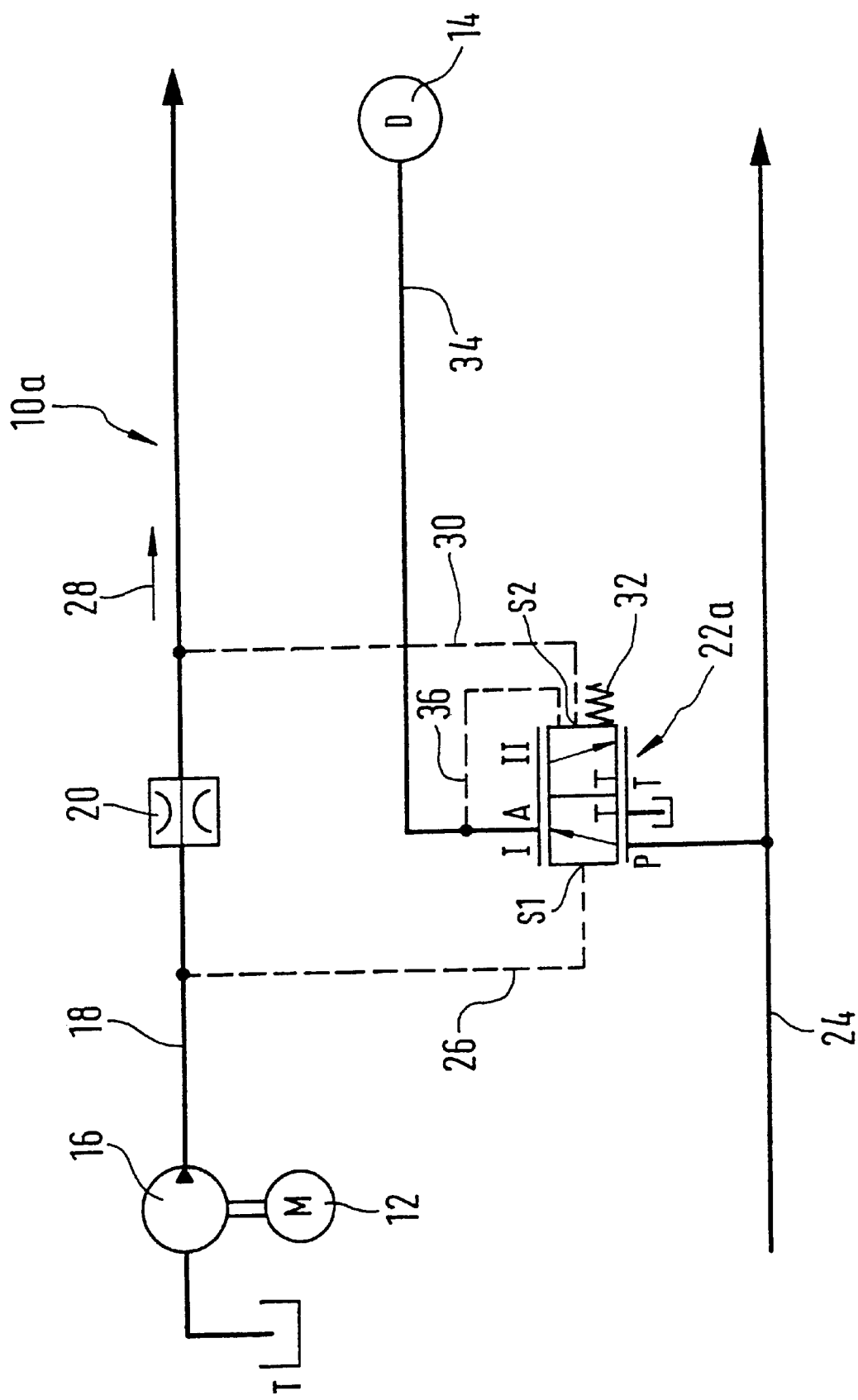
FIG. 3 is a schematic view of a first modification of the hydraulic emergency control according to FIG. 1.

A first modified hydraulic emergency control 10a is shown in FIG. 3. In this case, the regulating valve 22a has a return spring 32 arranged at its second control input 52.

Figure 4:
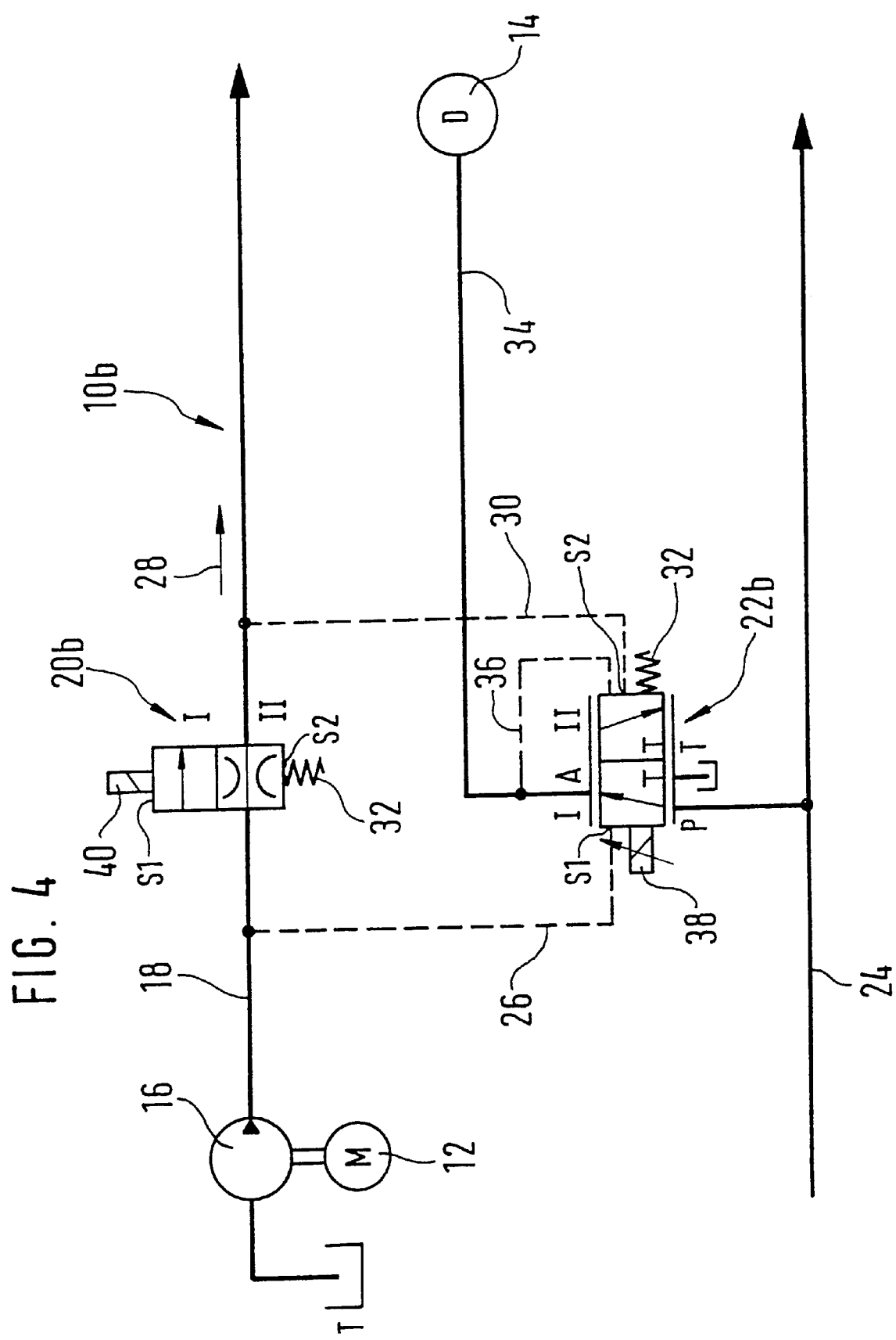
FIG. 4 is a schematic view of a second modification of the hydraulic emergency control according to FIG. 1.

The second modified hydraulic emergency control 10b according to FIG. 4 has a regulating valve 22b with an electric control 38 provided at its first control input S1. Alternatively, the control 38 can also be electrohydraulic. A return spring 32 is arranged at the second control input S2. The choke 20b is constructed as a switchable throttle valve having two switching positions I,II. An electric or hydraulic control 40 is provided at the first control input S1 of the choke 20b. A return spring 32 is arranged at the second control Input 52. In switching position I, the hydraulic oil can be conveyed through the work line 18 without hindrance. In switching position II, it flows through the diaphragm for example.

In normal operation, the choke 20b is switched so that it is in switching position I. The hydraulic oil can flow unimpeded in switching position I. To this extent, there is also no pressure drop at the choke 20b. Therefore, there is no pressure difference at the control inputs S1, S2 of the regulating valve 22b generated by the control lines 26, 30 due to the pressure drop ΔP. The controlling of the clutch 14 in normal operation is carried out in that the regulating valve 22b is controllable electrically or hydraulically at the first control input S1.

In case of failure of the electric supply, the choke 20b is moved into switching position II by the return spring 32 at the second control input S2. The control signal at the first control input S1 of the regulating valve 22b is also dispensed with. However, the clutch 14 can be controlled again by the hydraulic emergency control, which is now put into operation. The pressure difference, which is necessary for this purpose and which corresponds to the pressure drop Δp, is applied to the control inputs S1, S2 of the regulating valve 22b. This arrangement has the advantage that the clutch 14 is controllable in normal operation as well as in emergency operation by a structural component part, namely, the regulating valve 22b. The regulating valve 22b can be electromagnetic and can have a magnet, which has a rising or falling characteristic line. Instead of a direct control by a magnet, hydraulic control with a pilot or relay valve is also possible.

Figure 5:
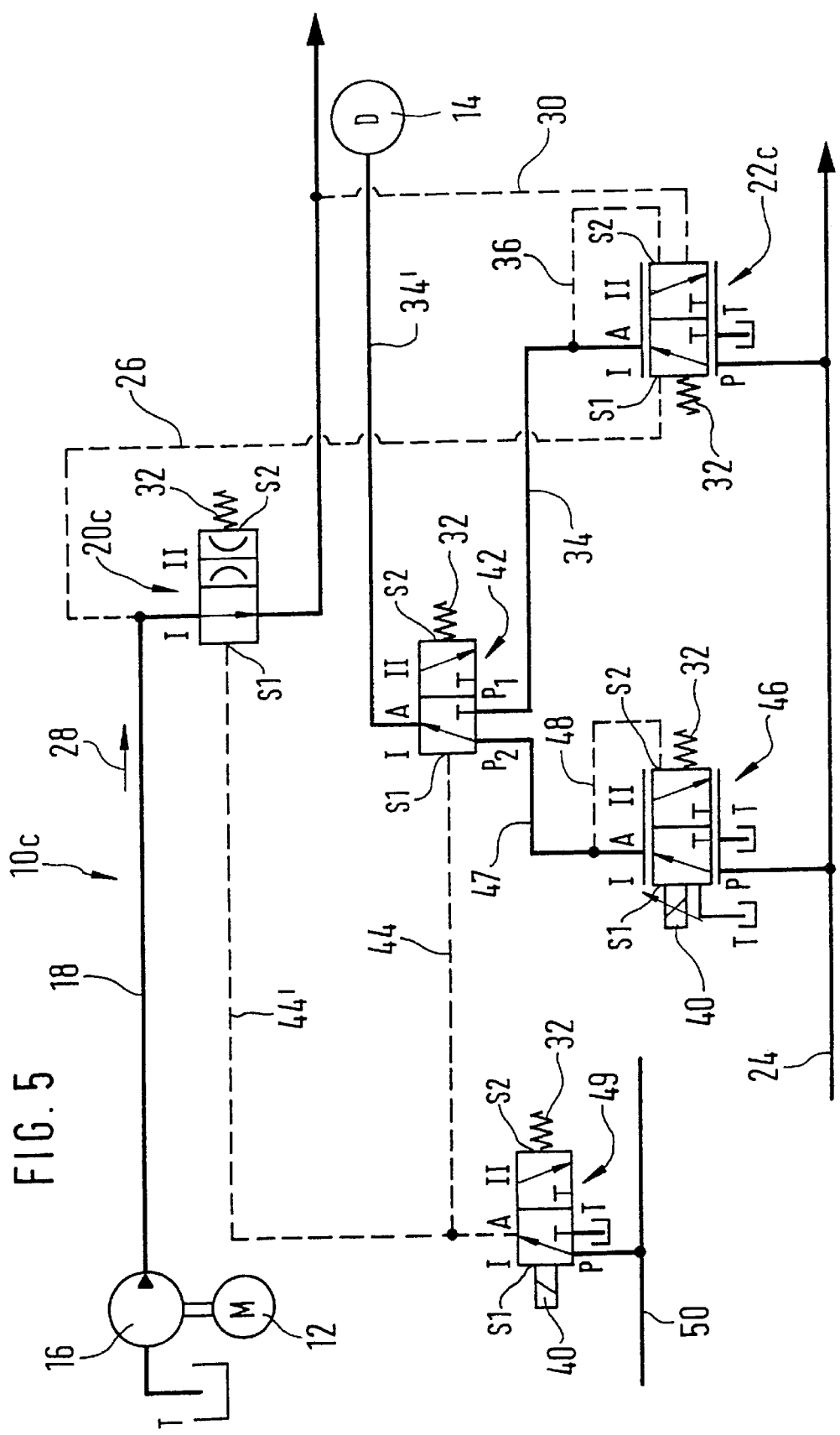
FIG. 5 is a schematic view of a third modification of the hydraulic emergency control according to FIG. 1.

FIG. 5 shows a third modification of a hydraulic emergency control 10c. In this case, a first switching valve 42 is provided whose work connection A is connected with the clutch 14 via the clutch line 34'. The first control input S1 is controllable hydraulically in normal operation, which is carried out in the present embodiment example via a control line 44. However, electric control is also conceivable. A return spring 32 is arranged at the second control input S2 of the first switching valve 42. The first switching valve 42 further has two pressure connections P1, P2. The work connection A of the regulating valve 22c for controlling the dutch 14 during an outage of the electric supply of the electrohydraulic clutch control, which corresponds to the regulating valve 22, is connected with the first pressure connection P1 of the first switching valve 42.

An additional regulating valve 46 is provided for controlling the clutch 14 in normal operation. An electric or hydraulic control 40 is provided at the first control input S1 of the additional regulating valve 46. The additional regulating valve 46 has a return spring 32 arranged at its second control input 52. The work connection A of the additional regulating valve 46 is connected with the second pressure connection $P_2$ of the first switching valve 42. The pressure connection P of the additional regulating valve 46 is connected with the supply line 24. A leakage connection leading to the tank T is additionally provided at the first control input S1. The connection from the work connection A to the second pressure connection P2 of the first switching valve 42 is carried out via a line 47. A return line 48 is connected with line 47 and with the second control input of the additional regulating valve 46.

A switchable throttle valve 20c, operating as a choke, is provided, which is similar to choke 20b in the modifications of FIGS. 3 and 4. A control line 44' is connected to the first control input S1 of the choke 20c. The control lines 44, 44' are connected to the work connection A of a second switching valve 49. The work connection A of the second switching valve 49 is accordingly connected with the first control input S1 of the first switching valve 42 and with the first control input S1 of the choke 20c. The first control input S1 of the second switching valve 49 has an electric or hydraulic control 40 so that it can be controlled electrically or hydraulically in a simple manner. A return spring 32 is provided at the second control input of the second switching valve 49. The pressure connection P of the second switching valve 49 is connected with a line 50. However, a connection to the supply line 24 is also possible as an alternative.

In normal operation, the second switching valve 49 is controlled at the first control input S1 so that it is in switching position I. In this case, the pressure connection P and work connection A are connected with one another. The choke 20c is moved into its switching position I via the control line 44'. Therefore, hydraulic oil flows without throttling through the work line 18 and the choke 20c, so that there is substantially a pressure equilibrium at the control inputs S1, 82 of the regulating valve 22c. The pressure occurring in the control line 44 and at the first control input S1 of the first switching valve 42 moves the first switching valve 42 into switching position I. In so doing, the second pressure connection $P_2$ is connected with the work connection A of the first switching valve 42. In this way, the clutch 14 is controlled via the additional regulating valve 46 in normal operation.

During an outage of the electric supply, the return spring 32 of the second switching valve 49 presses the latter into switching position II. This connects the work connection A of the second switching valve 49 with the tank connection T. The control lines 44, 44' are accordingly without pressure. The choke 20c, the first switching valve 42 and the second switching valve 49 are now brought into switching position II via the respective return spring 32. At the first switching valve 42, the work connection A is now connected with the first pressure connection P1 and, therefore, with the work connection of the regulating valve 22c. A pressure drop Δp occurs again at the choke 20c, so that the regulating valve 22c takes over the control of the clutch 14.

The use of a regulating valve 22 for controlling a clutch 14, at least in case of outage of the electric supply of the electrohydraulic clutch control, allows variable closing of the clutch 14 adapted to the respective start-up situations. Accordingly, many functions can be realized by one structural component part.

Use in continuously variable transmissions (CVTs) is particularly advantageous because a choke In the form of a measurement diaphragm can already be used for regulation of transmission ratio in emergency operation. It is also possible to close the clutch 14 during failure of the control electronics with this choke for transmission ratio regulation in emergency operation. Therefore, costs for the hydraulic emergency control can be kept low.

What is claimed is:

1. A hydraulic system for a hydraulically actuated clutch arranged between an internal combustion engine and a transmission as part of an electrohydraulic clutch control system, and including hydraulic emergency control, comprising a pump driven by the internal combustion engine and delivering pressurized fluid to a work line;

a throttle valve in the work line;

a regulating valve having an output port connected to the clutch by a clutch line, said regulating valve comprising means for controlling the clutch upon failure of an electrical supply for the electrohydraulic clutch control system;

a first control line connected to the work line upstream of the throttle valve and to a first control input of the regulating valve;

a second control line connected to the work line downstream of the throttle valve and to a second control input of the regulating valve;

a third control line connected to the clutch line and to a third control input of the regulating valve;

wherein, when pressure in the first control line increases faster than pressure in the second control line, an opening cross section between a pressure port and the output port increases.

2. The hydraulic system as defined in claim 1, wherein the third control input acts in a same direction on the regulating valve as the second control input.

3. The hydraulic system as defined in claim 1, and further comprising a return spring acting on the regulating valve.

4. The hydraulic system as defined in claim 3, and wherein the return spring acts in a same direction on the regulating valve as the first control input.

5. The hydraulic system as defined in claim 3, and wherein the return spring acts in a same direction on the regulating valve as the second control input.

6. The hydraulic system as defined in claim 5, and wherein the regulating valve is an electrohydraulically or electrically controlled regulating valve and, in normal operation, the electrohydraulic or electric control acts in a same direction as the first control input.

7. The hydraulic system as defined in claim 1, and wherein the throttle valve is an electrically or hydraulically operable valve, actuated during normal operation, and biased to a throttling position by a return spring, upon failure of the electrical supply.

8. The hydraulic system as defined in claim 1, and further comprising a first switching valve having an output port connected to the clutch and first and second input ports; and wherein the first input port is connected to the regulating valve, an additional electrically or hydraulically controlled regulating valve is connected to the second input port, for controlling the clutch during normal operation, and the first switching valve is electrically or hydraulically actuated during normal operation, and biased to a failure position by a return spring, upon failure of the electrical supply.

9. The hydraulic system as defined in claim 8, and further comprising a second switching valve having an output port connected to the first switching valve and the throttle valve, and wherein the second switching valve is an electrically or hydraulically actuated during normal operation, and biased to a failure position by a return spring, upon failure of the electric supply.

* * * * *